July 3, 1951   H. BRUYNES   2,558,816
FLUID MIXING DEVICE
Filed Aug. 16, 1947   3 Sheets-Sheet 1
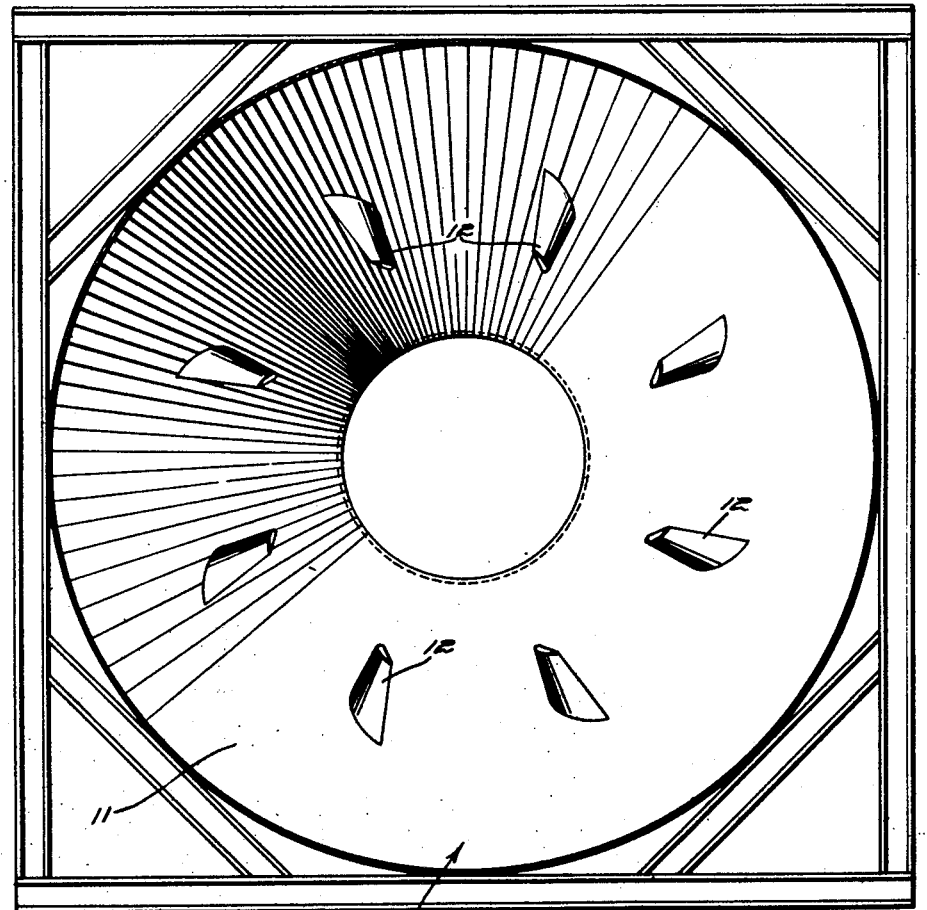
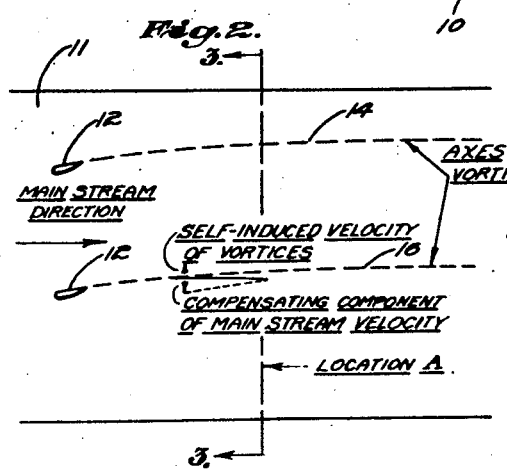
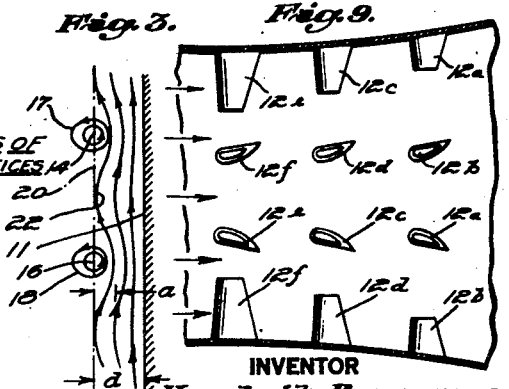
INVENTOR
Hendrik Bruynes
BY
M. B. Tasker
ATTORNEY July 3, 1951

H. BRUYNES 2,558,816

FLUID MIXING DEVICE

Filed Aug. 16, 1947

INVENTOR
*Hendrik Bruynes*
BY *M. B. Tasker*
ATTORNEY

July 3, 1951  H. BRUYNES  2,558,816
FLUID MIXING DEVICE
Filed Aug. 16, 1947  3 Sheets-Sheet 3
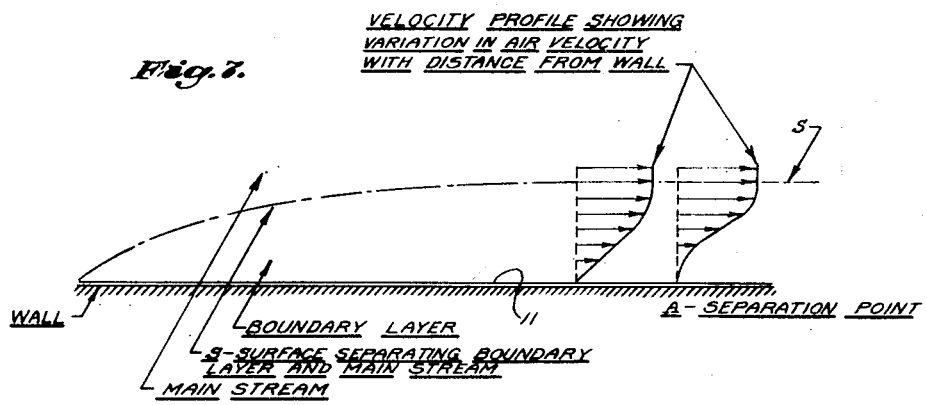
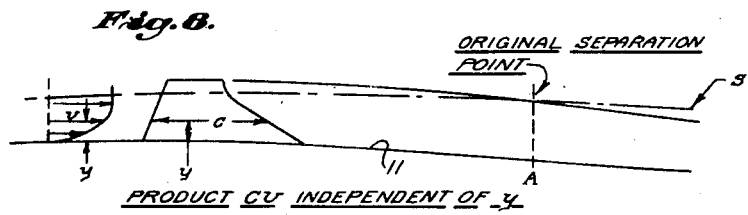
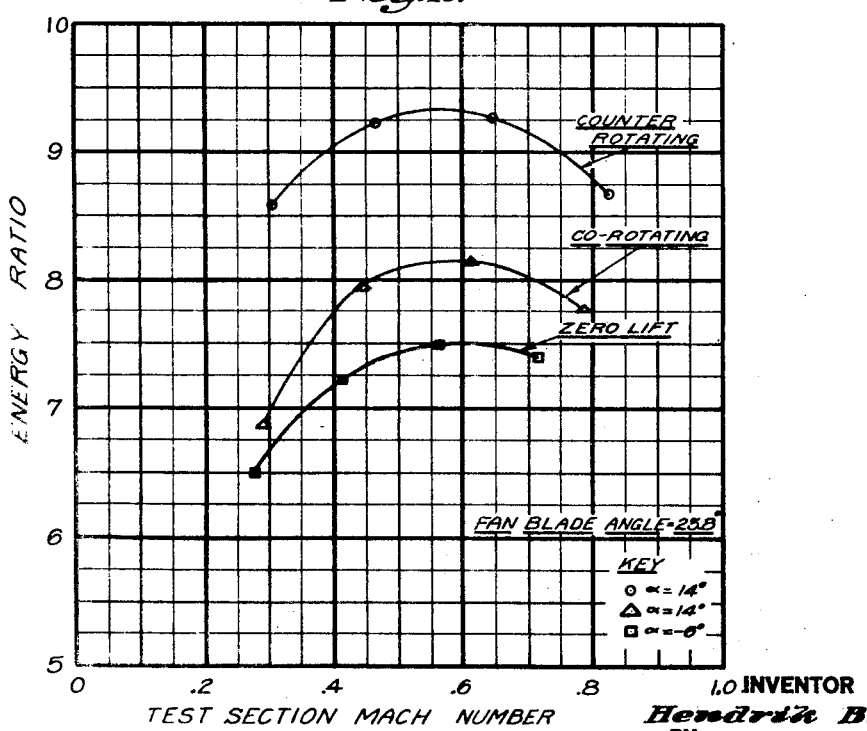
INVENTOR
Hendrik Bruynes
BY
M. B. Tasker
ATTORNEY Patented July 3, 1951

2,558,816

UNITED STATES PATENT OFFICE 2,558,816

FLUID MIXING DEVICE

Hendrik Bruynes, Hartford, Conn., assignor to United Aircraft Corporation, East Hartford, Conn., a corporation of Delaware Application August 16, 1947, Serial No. 769,042

7 Claims. (Cl. 138—37)

This invention relates to means for improving the flow in fluid conducting passages such as wind tunnels, diffusers, and the like; and has as one of its objects the provision of means for creating a planned turbulence in such a passage to provide complete mixing of the components of the fluid stream flowing through the passage.

Another object of the invention is the provision of means for transferring energy from the high-speed main flow in the center of a fluid conducting passage to the slow moving boundary flow adjacent the walls of the passage.

Another object of this invention is to increase the efficiency of fluid flow over airfoil shaped surfaces by utilizing a portion of the energy of the main fluid stream to energize the slow moving boundary layer adjacent such surfaces thereby delaying separation of the fluid downstream to increase the flow efficiency and maximum lift coefficient of said surface.

A further object of the invention is generally to improve the flow characteristics of fluids in regions where the velocity of the fluid, or its composition, is not constant across the stream; i. e., at regions where hot and cold streams are present or fluids of different characteristics are flowing.

These and other objects and advantages of the invention will become apparent or will be particularly pointed out in the following detailed description of two embodiments of the invention shown for purposes of illustration in the accompanying drawings in which blades of airfoil cross section are utilized to generate fine eddies and cause a steady mixing action between the main stream and the boundary layer.

In these drawings,

Fig. 1 is a front view of the diffuser passage of a wind tunnel embodying the invention;

Fig. 2 is a diagrammatic view of a developed portion of the diffuser wall;

Fig. 3 is a section on line 3—3 of Fig. 2 which line is taken at the separation point A of Fig. 7;

Fig. 7 is a diagrammatic view illustrating a separating boundary layer;

Fig. 8 is a diagrammatic view indicating the design considerations which determine the shape and location of the vortex generating airfoils;

Fig. 9 is a vertical cross section through a large diameter passage showing the use of a plurality of sets of vortex generating blades to produce complete mixing of entire stream; and Fig. 10 is a chart showing a comparison of the effect of counter-rotating and co-rotating airfoil configurations on enery ratio.

Figure 4:
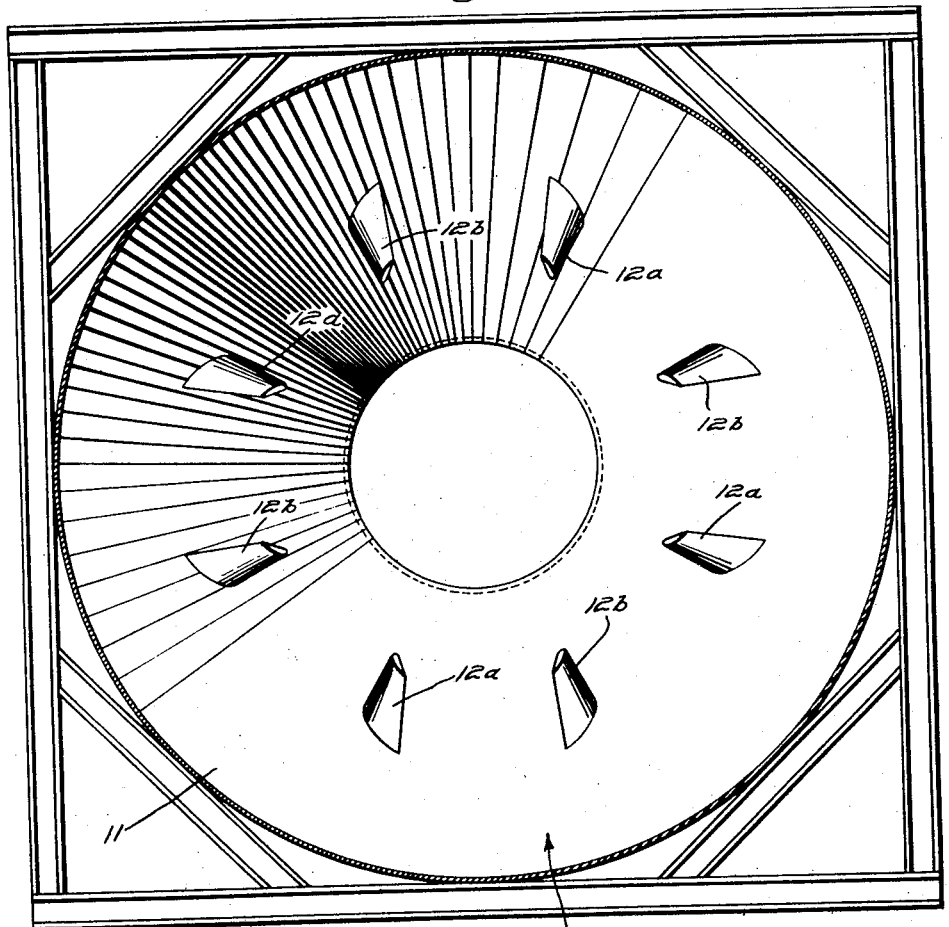
Fig. 4 is a view similar to Fig. 1 showing another form of the invention.

It is known that when any fluid having viscosity flows past a surface with which it is in contact, such as a wall of a conduit confining the fluid flow or over an airfoil, the velocity of the fluid in the region adjacent the wall is reduced by friction with the surface and a layer of fluid is formed characterized by a lower velocity than the velocity of the adjacent main stream. This low velocity layer is referred to as the boundary layer.

It is further known that when a fluid flows through a passage from a region of low pressure to a region of high pressure, as in a diffuser passage, in which the cross section of the passage enlarges in a downstream direction, the action of the pressure forces is such as to retard the fluid. This retarding action is, in many cases, sufficiently strong to arrest and reverse the flow of the slow moving fluid in the boundary layer resulting in a flow which is commonly referred to as "separated flow" in which the main fluid stream no longer follows the confining surface but flows so as to by-pass quantities of arrested fluid adjacent the wall.

Various attempts have been made to prevent separation, for example, by the introduction of a high velocity fluid to activate the boundary layer fluid or by removal of the retarded boundary layer fluid through slots or perforations in the wall past which the fluid is moving. The present invention is concerned with an entirely different approach to this problem by which means are provided in the fluid conducting passage for setting up fluid mixing vortices in the fluid in the passage which control the fluid velocity in the boundary layer.

The fluid mixing vortices not only mix the slow moving boundary layer fluid with the high velocity main stream fluid and thus improve the general flow characteristics in the passage, but when the vortex generators are properly located, as hereinafter fully described, the vortices effect a thorough mixing of all the flow components in the passage so that the fluid stream downstream from the vortices comprises a uniform mixture of all the flow components which may be introduced upstream of these vortices.

Referring to Fig. 1, 10 indicates generally the diffuser section of a circular wind tunnel viewed from the downstream end of the diffuser passage. A plurality of vortex generators 12 are equally spaced peripherally on the expanding walls 11 of the diffuser passage. These generators comprise blades of airfoil section secured at their bases to the diffuser surface with the span of the airfoil perpendicular to the diffuser wall. The blades project radially inwardly and are set at identical predetermined angles of attack to provide co-rotating vortices. In other words, these vortices, which are of the nature of the vortices that trail the wing tips of an airplane due to the differential pressures above and below the lift-producing wings, rotate about their respective axes in the same direction, i. e., counterclockwise as viewed in Fig. 1.

Fig. 2 shows a developed portion of the wall 11 of the diffuser passage in elevation and indicates at 14 and 16 the axes of two vortices trailing downstream from two blades 12 shown projecting from wall 11 into the fluid stream. It will be noted that the vortices tend to move along the wall in a slightly upward direction as viewed in Fig. 2 so as to lie at a small angle with the main stream direction. As a result, the main stream velocity has a compensating component indicated in Fig. 2 which acts so as to maintain the vortices in fixed position.

The section shown in Fig. 3 is taken at location A of Fig. 2, which corresponds to point A in Fig. 7, and which is the location along wall 11 at which, in the absence of blades 12, separation takes place. Fig. 3 shows the motion which is superimposed at the separation point A on the motion of the fluid stream by the action of the vortices, indicated at 17 and 18. The line 20 represents a trace of the imaginary surface separating the boundary layer adjacent wall 11 and the main stream flow in the passage. It will be noted that the blades 12 are located at a point upstream from point A and are of such span and so arranged to produce the maximum effect commensurate with the flow characteristics and the shape of the confining surface. It may be necessary to locate the vortex generators at a station sufficiently upstream of the fluid separation point depending upon the growth and shape of the boundary layer up to the separation point. Line 22 represents a line such that on the side of this line near the wall the combined action of the vortices imposes a motion on the fluid which is mainly sidewise, while on the side of this line 22 remote from the wall the vortices effect exchange with the main stream fluid of that portion of the boundary layer fluid which is represented in this figure by the area between the lines 20 and 22. The ratio $a/d$ of the distances $a$ and $d$, shown in Fig. 3 represents the penetration ratio of this vortex arrangement.

This arrangement of the vortex generating blades by which co-rotating vortices are produced has certain disadvantages. If the vortices are brought close together in order to increase the number of vortices per unit distance transverse to the main stream, this penetration ratio decreases and the decrease adversely affects the performance of the vortices. Furthermore, for any given distance between vortices, the penetration ratio is less than 1, i. e., only a part of the boundary layer is effectively involved in the mixing process. The most favorable effect is obtained when successive vortices are separated by a distance not less than 2 or more than 6 times the distance between any vortex and the wall.

Figure 5:
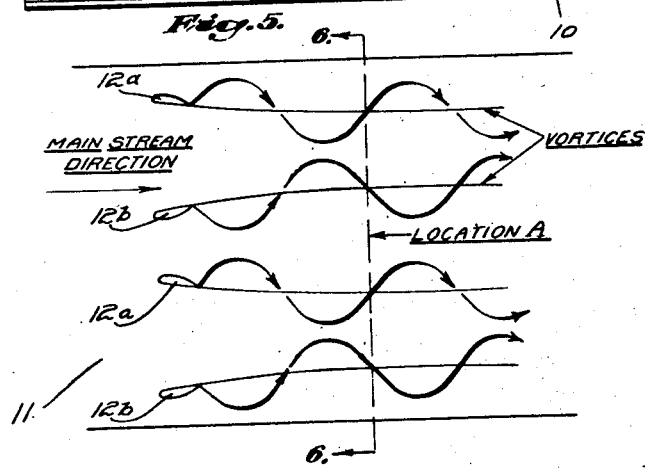
Fig. 5 is a diagrammatic view illustrating the flow patterns resulting from the Fig. 4 construction.

Fig. 4 shows a superior arrangement of the vortex generators in which the blades 12a and 12b are arranged with their chords inclined alternately in opposite directions so that the trailing vortices of adjacent blades rotate in opposite directions. The vortices produced by this arrangement of the blades are referred to herein as counter-rotating vortices as distinguished from the vortices produced by the arrangement shown in Fig. 1 in which the blades have their chords inclined in the same direction. These counter-rotating vortices are shown in Fig. 5 in which a developed portion of the wall 11 is shown in elevation similar to the showing in Fig. 2 and four adjacent blades are shown of which blades 12a have their angle of incidence inclined in one direction and blades 12b have their angle of incidence oppositely inclined, producing adjacent counter-rotating vortices 24 and 26.

Figure 6:
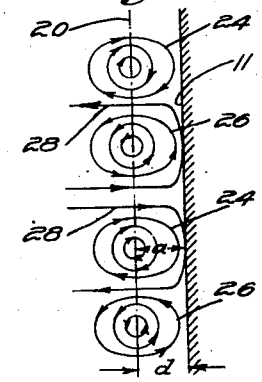
Fig. 6 is a sectional view on line 6—6 of Fig. 5 taken at point A of Fig. 7.

The action of the vortices in tending to move along the wall is compensated in the case of counter-rotating vortices by both the interaction of the vortices with the main stream and by the interaction of oppositely rotating vortices approaching each other along the wall. The sectional view in Fig. 6, which is taken at separation point A, shows approximately the resulting stable position of the vortices. This figure also shows the motion superimposed on the main motion of the fluid by the action of these counter-rotating vortices. Line 20 in Fig. 6 represents the trace of imaginary surface S separating the boundary layer and the main stream (Fig. 7) and it will be noted that at the section on which Fig. 6 is taken the vortex cores line 20 and will substantially produce the maximum desirable energy transfer between the main stream and the boundary layer along this line. It will be evident from a study of this figure that the motion imposed by the action of the vortices in the case of counter-rotating vortices effects an exchange of fluid between the boundary layer and the main stream which involves the entire boundary layer as indicated by lines 28 so that the penetration ratio $a/d$ of the counter-rotating vortex arrangement is 1, regardless of the distance between successive vortices. It has been found that the action resulting along the boundary layer appears in the form of a slowly rotating mass which moves downstream at a greater rate than does the slow moving boundary layer. It is indicated that more vortex generating blades may be effectively employed in the counter-rotating arrangement than in the co-rotating arrangement of vortices. The above explanation makes clear the superiority of the counter-rotating vortices over the co-rotating vortices of Fig. 1. The most favorable effect is obtained when successive vortices are separated by a distance not less than 1 nor more than 6 times the distance between any vortex and the wall.

The airfoils used to generate the vortices are constructed in such a way that the only vortex shed by the airfoil is the tip vortex in which case, as is known from aerodynamical theory, the circulation of fluid about an airfoil which is mounted on the wall with its span perpendicular to the wall must be the same at all spanwise stations. For a given lift coefficient of an airfoil section the circulation about the section depends on the product of the airfoil chord and the velocity of the stream passing the section, hence for a straight (no twist) airfoil, i. e., for an airfoil having a constant lift coefficient this product must be the same at all spanwise stations. Since in the arrangements above discussed, the airfoils are mounted on the wall and for the major part are immersed in the boundary layer, and since the stream velocity in the boundary layer varies with the distance from the wall, it follows that the chord of any section of the vortex generating airfoil should depend on the distance of that section from the wall in such a manner that the product of the chord $c$ of the airfoil section and the stream velocity $v$ in the boundary layer is independent of the distance $y$ (Fig. 8) from the wall 11. The vortex generating airfoils are constructed so as to approximate this design condition as closely as feasible. Thus, as stated above only a tip vortex will be generated by the airfoil and transient vortices will be eliminated along the trailing edge thereof between the tip and the wall.

In the construction of a diffuser employing vortex generators, the generators must be placed in the high-speed side of the diffuser, so far upstream from the separation point A that the mixing is initiated upstream from the point A to the extent that at point A the maximum effect is produced.

In a very large diameter passage, in order to provide a thorough mixing of the boundary layer and the entire main steam including the fluid flowing in the center of the passage, it may be desirable to provide more than one set of peripherally arranged vortex generators with the several sets located at progressively spaced points downstream. In this case the downstream set should be constructed as described and illustrated above and each successive upstream set should extend progressively farther spanwise of the generating airfoils into the stream (Fig. 9). In this way thorough mixing of all parts of the stream will be accomplished. Furthermore, the planned mixing provided by the vortex generators is such that the eddies produced rotate about axes which trail downstream and generally parallel with the axis of the passage. As contrasted with the turbulent flow which is present in a diffuser passage, for example, where separation of the main flow from the wall takes place, the flow resulting from this planned mixing is a very efficient flow.

This arrangement of a plurality of sets of vortex generators is shown diagrammatically in Fig. 9 in which the blades 12a, 12b described in connection with Figs. 4, 5 and 6 are shown as the downstream set. The blades 12c, 12d comprising the next upstream set may be identical in their angle of incidence and differ only in that they extend farther spanwise into the airstream. The upstream set of vortex generators 12e, 12f extend even farther into the airstream. By this arrangement the boundary layer is moved into the axis of the main stream and a thorough mixing of all the flow components of the stream takes place.

It will be evident that as a result of this invention means have been provided for effectively mixing the flow components in a fluid conducting passage so as to thoroughly mix these components whether they be different fluids or merely fluids tending to move at different velocities with a resultant improvement in the flow characteristics in the passage. In the wind tunnel illustrated in the drawings, with the counter-rotating airfoil shown in Fig. 4 set at an angle of 14°, a saving of 1800 horsepower was effected at a test section Mach number of 0.8.

In Fig. 10 the energy ratios are plotted for a certain wind tunnel for various Mach numbers with the airfoils set at a zero lift angle of —6° and with the airfoils set at 14° co-rotating and 14° counter-rotating, showing that the counter-rotating vortices arrangement is far superior to the co-rotating arrangement.

"Energy ratio" is a quantity specifying the performance of a wind tunnel, a high energy ratio indicating that for a given amount of power a high test section Mach number is obtained. Energy ratio is the ratio of the energy of the air passing the test section in a given time to the energy supplied by the tunnel motor in that time.

While two embodiments of the invention have been shown and described herein in detail, it will be evident that various changes in the construction and arrangement of the parts is possible without departing from the scope of the invention as defined by the following claims. It will also be evident that the invention is not limited to wind tunnels, but is applicable to any situation where fluid flows along a surface, either external or comprising a passage wall, wherein there exists an appreciable boundary layer, such as airscoops, compressor inlets, turbine combustion chambers, turbine discharges, airfoil surfaces and a variety of other places where fluids flow in a field of either uniform or expanding cross section.

I claim:

1. In combination, a fluid flow confining passage, and means for setting up a plurality of vortices in the fluid stream flowing through said passage about axes generally parallel with the direction of fluid flow, said means comprising a plurality of blades of airfoil cross section projecting from the wall of said passage into said stream at spaced points about its periphery and terminating in blade tips located in said stream adjacent the imaginary surface separating the boundary layer and main stream flows, said blades having their chord lines inclined relative to the stream flowing through said passage to set up vortices trailing from said blade tips.

2. In combination, a fluid flow confining passage, and means for setting up a plurality of vortices in the fluid stream flowing through said passage which rotate about axes generally parallel with the direction of the fluid stream, said means, including a plurality of blades of airfoil cross section carried by the wall of said passage at spaced points about its periphery extending transversely into said stream and terminating in blade tips located in said stream adjacent the imaginary surface separating the boundary layer and main stream flows, said blades having their chord lines inclined relative to the stream flowing through said passage, the adjacent blades being oppositely inclined to produce adjacent counter-rotating vortices.

3. In combination, a fluid flow confining passage, and means for setting up a plurality of vortices in the fluid stream flowing through said passage which rotate about axes generally parallel with the direction of the fluid stream, said means including a plurality of blades of airfoil cross section carried by the wall of said passage at uniformly spaced points about its periphery extending transversely into said stream and terminating in vortex producing tips located in said stream adjacent the imaginary surface separating the boundary layer and main stream flows, said blades having their chord lines inclined relative to the stream flowing through said passage, the inclination of all of said blades being in the same direction whereby said vortices all rotate about their respective axes in the same direction.

4. In combination, a fluid confining surface of airfoil shape over which a main fluid stream of determinable characteristics flows, and means for mixing the boundary layer flow immediately adjacent said surface whereby a portion of the energy of the main fluid stream is utilized to energize said boundary layer, said means including a plurality of vortex generators carried by said surface and projecting into the main stream to a point approximately adjacent the imaginary surface separating the boundary layer and main stream flows, the vortices produced trailing downstream from each of said generators.

5. In combination, a continuous fluid confining surface over which a main fluid stream of determinable characteristics flows, and means for energizing the boundary layer adjacent said surface including vortex generators carried by said surface and projecting into the fluid stream, each generator creating individual vortices in said stream which have their axes substantially parallel to the axis of flow and transmit a portion of the energy from said main fluid stream to said boundary layer, said generators comprising blades of airfoil cross section which have their chords set at an angle to the oncoming fluid stream and terminate in tips adjacent the imaginary surface separating the boundary layer and main stream, adjacent blades being inclined oppositely relative to said stream to set up adjacent counter-rotating vortices.

6. In combination, a diffuser through which flows a main fluid stream of determinable characteristics, said diffuser having walls of a divergence tending to cause separation of the fluid from the walls, and means for delaying said separation of said main fluid stream from the walls of said diffuser including vortex generators for mixing the boundary layer adjacent said walls with the remainder of said main stream, said generators being located upstream of the point of separation and comprising blades of airfoil cross section peripherally spaced at uniform intervals about said walls and having their chords set at an angle to the oncoming fluid stream, said blades projecting from said walls to a point adjacent the imaginary line separating the boundary layer from the remainder of said main fluid stream, adjacent blades being oppositely inclined relative to said main stream whereby adjacent counter-rotating vortices are produced.

7. In combination, a fluid contact surface over which a main fluid stream flows, and means for mixing the boundary layer flow immediately adjacent said surface whereby a portion of the energy of the main fluid stream is utilized to energize said boundary layer, said means including a plurality of vortex generators carried by said surface and projecting into the main stream to a point approximately adjacent the imaginary surface separating the boundary layer and main stream flows, the vortices produced trailing downstream from each of said generators.

HENDRIK BRUYNES.

REFERENCES CITED

The following references are of record in the file of this patent:

UNITED STATES PATENTS

| Number | Name | Date |
|---|---|---|
| 2,026,482 | Mattioli | Dec. 3, 1935 |
| 2,041,793 | Stalker | May 26, 1936 |
| 2,183,561 | Hamblin | Dec. 19, 1939 |
| 2,396,911 | Anxionnaz et al. | Mar. 19, 1946 |

OTHER REFERENCES

Aerodynamics of the Airplane, Millikan, page 94 (Div. 22.)